US008985447B2

(12) United States Patent
Ardis et al.

(10) Patent No.: US 8,985,447 B2
(45) Date of Patent: Mar. 24, 2015

(54) SECURE PAYMENT CARD INTERFACE (71) Applicant: Maxim Integrated Products, Inc., San Jose, CA (US)

(72) Inventors: Kristopher Leigh Ardis, Trabuco Canyon, CA (US); Tangkwai Ma, Plano, TX (US); Robert Michael Muchsel, Addison, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 211 days.

(21) Appl. No.: 13/666,458

(22) Filed: Nov. 1, 2012

(65) Prior Publication Data
US 2014/0299664 A1 Oct. 9, 2014

(51) Int. Cl.
G06K 7/00 (2006.01)
G06F 21/85 (2013.01)
G06F 21/86 (2013.01)
G06K 7/08 (2006.01)
G06K 19/073 (2006.01)

(52) U.S. Cl.
CPC ............... *G06F 21/85* (2013.01); *G06F 21/86* (2013.01); *G06K 7/00* (2013.01); *G06K 7/0078* (2013.01); *G06K 7/08* (2013.01); *G06K 19/07327* (2013.01)
USPC ........................................ 235/440; 235/441

(58) Field of Classification Search
CPC ................... G06K 19/0723; G06K 19/06187; G06K 19/06206; G06K 19/07; G06K 19/0774; G06K 7/00; G06K 9/00; G07F 19/20; G06Q 20/00; G06Q 20/341; G06Q 20/40145
USPC ............. 194/217; 235/380, 439, 375, 462.25, 235/383, 451, 381, 441, 440
See application file for complete search history.

(56) References Cited

U.S. PATENT DOCUMENTS

| 2008/0164320 A1* | 7/2008 | Garrido-Gadea et al. .... 235/486 |
| 2011/0321173 A1* | 12/2011 | Weston et al. .................. 726/27 |
| 2014/0263659 A1* | 9/2014 | Kervinen et al. ............. 235/488 |
| 2014/0317909 A1* | 10/2014 | Virtanen ......................... 29/600 |

* cited by examiner

*Primary Examiner* — Sonji Johnson
(74) *Attorney, Agent, or Firm* — North Weber & Baugh LLP (57) ABSTRACT

The invention relates to a smartcard reader, and more particularly, to systems, devices and methods of creating a card input/output interface that allows the smartcard reader to couple to a smartcard within a secure cavity. The secure cavity is mounted on an internal side of a system housing, i.e., a smartcard socket, included in the smartcard reader. An interface chip is further attached inside the secure cavity. When the smartcard is inserted to a designated position or depth inside the system housing, the secure cavity encloses the interface chip and its contact area with the smartcard. Mechanical contacts on the interface chip are thus aligned to and physically contact electrical connectors on the inserted smartcard, so as to electrically couple the interface chip and the smartcard. As a result, sensitive data within the smartcard may be protected from exposure to any tamper attempt and processed with an enhanced security level.

18 Claims, 6 Drawing Sheets

(PRIOR ART)

SECURE PAYMENT CARD INTERFACE

BACKGROUND

A. Technical Field

The present invention relates generally to a smartcard reader, and more particularly, to systems, devices and methods of creating a card input/output interface that allows the smartcard reader to couple to a smartcard within a secure cavity. When the smartcard is inserted into the smartcard reader, sensitive data within the smartcard is protected from exposure to a tamper attempt and thus processed with an enhanced security level.

B. Background of the Invention

Nowadays, financial transactions are normally completed via an automatic teller machine (ATM) or a point-of-sale (POS) terminal, such as a credit card reader. The ATMs and POS terminal devices are hardwired to the telephone network or internet, and can read account information from a physical card carried by a customer. The ATMs or POS terminals contact the bank/credit card company and complete trusted transactions involving approved monetary amount. Such ATMs and secure POS terminals have been widely applied in banking, retailer, hospitality and transportation industries and largely replaced cash transactions.

Figure 1A:
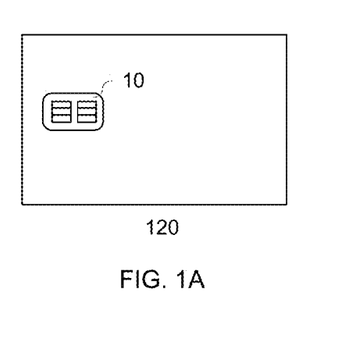
FIG. 1A illustrates a front side of a typical smartcard that is embedded with an integrated circuit.

Integrated circuit chips are sometimes embedded into the physical cards to provide identification, authentication, data storage and data processing. Such a card is referred as a smartcard or an integrated circuit cards (ICC). FIG. 1A illustrates a front side of a typical smartcard 120 that is embedded with an integrated circuit 10. When this smartcard is applied as a credit card or debit card, it normally incorporates another magnetic stripe on its backside for storing account or identification information as well. Although the magnetic stripe is a mature data storage format for financial transactions, the smartcard has started to be widely accepted for its enhanced security level and data processing capability.

When a customer inserts his or her payment card into the ATM or POS terminal devices, there is a window of opportunity for a criminal to detect and record confidential data by tampering a card interface. The card interface is situated at a paradoxical position where a physical open slot imposes a potential security threat to the secure terminals although it is necessary for card access. The criminal may gain access to electrical signals via the open slot at the card interface, and directly retrieve confidential data. Therefore, the card interface has to be carefully designed, assembled and integrated into the ATM or POS terminals to deter tamper attempts.

Figure 1B:
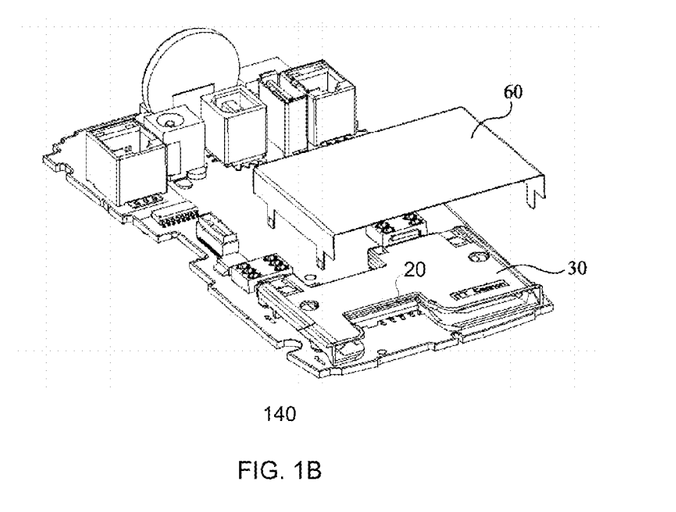
FIGS. 1B-1D illustrate an existing secure card interface solution, a side view of the card interface and a smartcard inserted into the card interface, respectively.
Figure 1C:
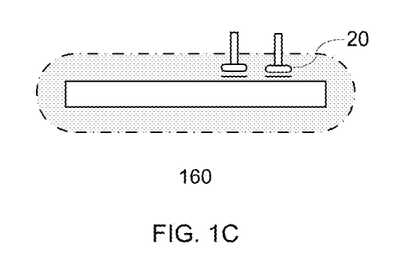
Figure 1D:
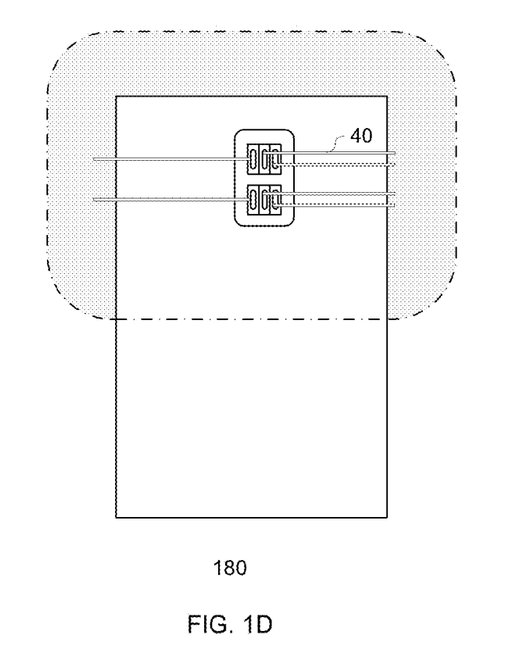

FIGS. 1B-1D illustrate an existing secure card interface solution 140, a side view of the enclosed card interface 160 and a smartcard inserted into the card interface, respectively. The card interface 140 relies on a cover 60 to make up an anti-tamper enclosure locally for a smartcard reader socket 30. Several mechanical contact pins 20 are extended outside the reader socket 30, but enclosed within the cover 60. When the smartcard is inserted into the card socket 30, the contact pins 20 directly land on electrical connectors on the smartcard, and thus, are further coupled to integrated circuits embedded in the smartcard. Inside the smartcard reader socket 30, these contact pins 20 are coupled via interconnects 40 to other internal integrated circuits (IC) for card reading. Data extracted from the smartcard is normally in plaintext, and subsequently, communicated to the internal card reading IC within the card interface for further processing including encryption. During this course of data extraction and transfer from the smartcard, confidential information in plaintext may be susceptible to tamper attacks at the contact pins 20 and interconnects 40.

SUMMARY OF THE INVENTION

Various embodiments of the present invention relate to a smartcard reader, and more particularly, to systems, devices and methods of creating a card input/output interface that allows the smartcard reader to couple to a smartcard within a secure cavity. When the smartcard is inserted into the smartcard reader, sensitive data within the smartcard is protected from exposure to tamper attempts and processed with an enhanced security level.

One aspect of the invention is a smartcard reader that avoids exposure of confidential data extracted from a smartcard. A secure cavity is mounted on an internal side of a system housing, i.e., a smartcard socket, included in the smartcard reader. An interface chip is further attached inside the secure cavity. When the smartcard is inserted to a designated position inside the system housing, the secure cavity encloses the interface chip and its contact area with the smartcard. Inside the secure cavity, mechanical contacts on the interface chip are aligned to and physically contact electrical connectors on the inserted smartcard, so as to electrically couple the interface chip and the smartcard.

One aspect of the invention is a card reader that processes confidential data from both a smartcard integrated circuit (IC) and a magnetic strip on a card. In addition to a first secure cavity and an interface chip that is used to process the smartcard IC, the card reader further comprises a second secure cavity that houses a magnetic stripe reader, and this magnetic stripe reader extracts and processes data stored on the magnetic stripe.

One aspect of the invention is a method of processing a smartcard. The smartcard is inserted into an open slot of a system housing included in a smartcard reader. As the smartcard reaches a designated position, a secure cavity encloses an interface chip and its contact area with the smartcard. This interface chip is attached to the secure cavity which is further attached to an internal side within the system housing. Mechanical contacts on the interface chip are thus aligned to and physically contact electrical connectors on the inserted smartcard such that the interface chip is electrically coupled to the smartcard. The data extracted from the smartcard is received and processed within the interface chip.

Certain features and advantages of the present invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Various embodiments of the present invention relate to a secure payment card interface included in a smartcard reader, and more particularly, to systems, devices and methods of creating a card input/output interface that allows the smartcard reader to couple to a smartcard within a secure cavity. This I/O interface is integrated in a socket included in a smartcard reader. When a smartcard is inserted into the socket, this interface is fully enclosed by the secure cavity. An interface chip within the smartcard reader is directly coupled to electrical connectors at the smartcard inside this enclosed secure cavity. Sensitive data stored within the smartcard has to be processed or encrypted by the interface chip prior to be transferred to a processor for further processing. As a result, the sensitive data within the smartcard is protected from exposure to tamper attempts, and may be processed with an enhanced security level.

Figure 2A:
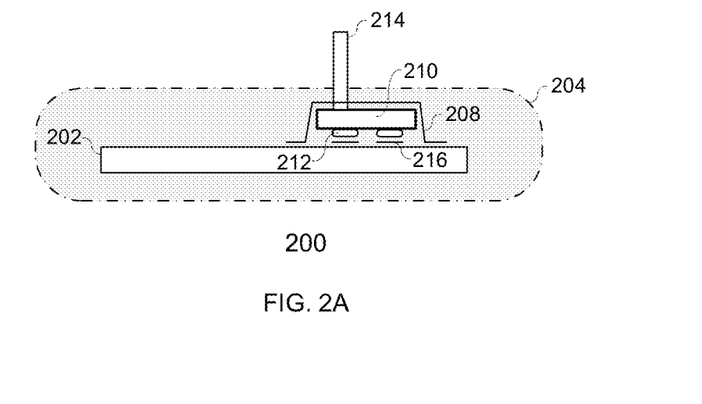
FIG. 2A illustrates an exemplary block diagram of a smartcard reader according to various embodiments in the invention.
Figure 2B:
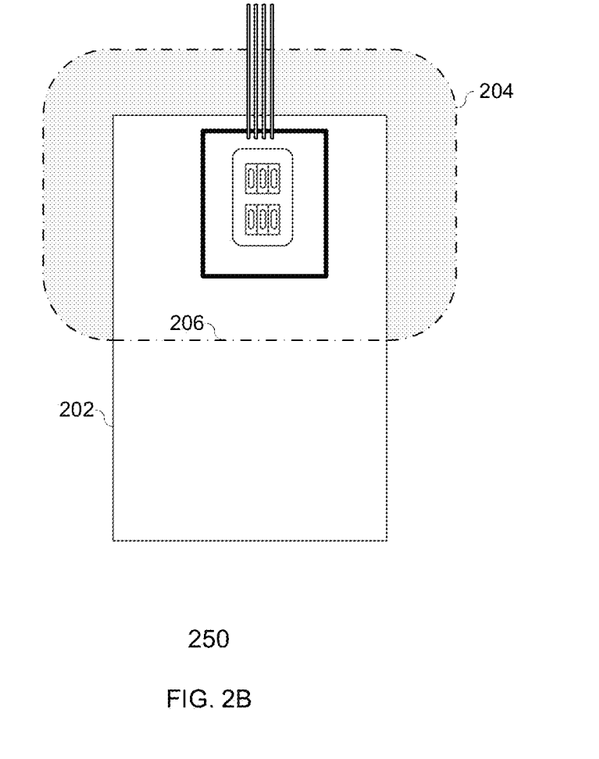
FIG. 2B illustrates a top view of the smartcard reader when a smartcard is inserted according to various embodiments in the invention.

FIG. 2A illustrates an exemplary block diagram 200 of a smartcard reader according to various embodiments in the invention, and FIG. 2B illustrates a top view 250 of the smartcard reader when a smartcard 202 is inserted according to various embodiments in the invention. The smartcard reader 200 is based on a system housing 204 that leaves an open slot 206 at one side, and the smartcard 202 is inserted into the smartcard reader 200 through this open slot 206. The smartcard reader 200 further comprises a secure cavity 208, an interface integrated circuit (IC) chip 210, mechanical contacts 212, and data lines 214, and these elements 208-214 are situated within a particular location within the system housing 204. When the smartcard 202 is inserted to a designed position or depth, electrical connectors 216 on the smartcard 202 are aligned to elements 208-214, and particularly, to mechanical contacts 212.

The secure cavity 208 is attached to one internal side, top or bottom, of the system housing 204, leaving one cavity side open. The open cavity side faces towards the incoming smartcard 202. The interface chip 210 is mounted inside the secure cavity 208, and the mechanical contacts 212 are formed on the top side of the interface chip 210. The top side of the interface chip 210 is also oriented towards the open cavity side. The interface chip 210 is further coupled to the data line 214 which couples output signals from the interface chip 210 out of the secure cavity 208 and the system housing 204.

When the smartcard 202 is inserted to the designated position or depth, the secure cavity 208 constitutes a closed cavity that encloses the interface chip 210, the mechanical contacts 212, and the electrical connectors 216. The data line 214 passes the secure cavity 208 at a side distinct from the open cavity side, such that the closed cavity is fully enclosed upon insertion of the smartcard 202.

An unencrypted data link is entirely eliminated within such a closed cavity. The interface chip 210 is flip-chip situated on the top of the electrical connectors 216 of the smartcard 202. Direct mechanical contact is formed between the mechanical contacts 212 and the electrical connectors 216 to electrically couple the interface chip 210 to integrated circuits within the smartcard 202. The interface chip 210 processes confidential data extracted from the smartcard 202, and particularly, encrypts the confidential data when such data needs to be transferred outside the secure cavity 208. As a result, only processed or encrypted data is exposed at the data line 214, and the confidential data is not only hid between the interface chip 210 and the smartcard 202 but also enclosed within a closed cavity.

Figure 3:
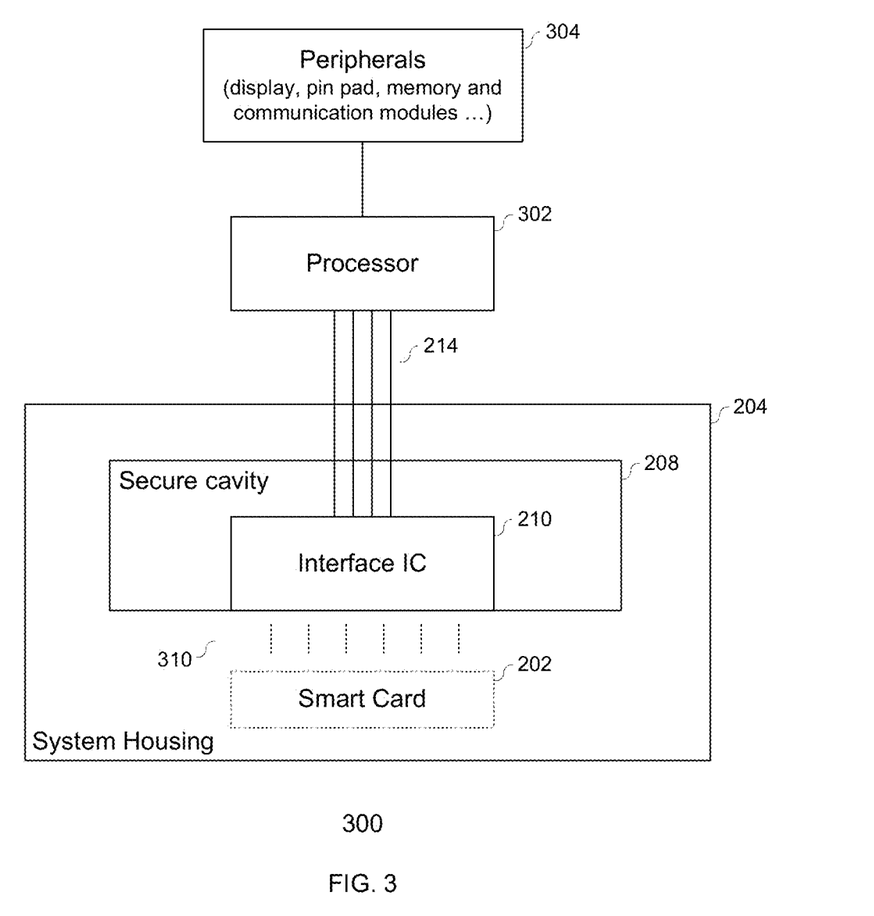
FIG. 3 illustrates an exemplary block diagram of a Point-Of-Sale (POS) system based on a smartcard reader according to various embodiments in the invention.

FIG. 3 illustrates an exemplary block diagram 300 of a point-of-sale (POS) system based on a smartcard reader 200 according to various embodiments in the invention. In addition to the smartcard reader 200, the POS system 300 comprises a processor 302 and peripherals 304, including a display, a pin entry mechanism, a memory and communication modules. The processor 302 is coupled to receive the processed or encrypted data via the data lines 214 for further data processing. In various embodiments of the invention, the processor 302 receives transaction requests from a customer, processes the transaction requests, extracts confidential information from the smartcard 202, commands communication with remote bank or credit card servers, and thus, completes the corresponding transactions.

Contact area 310 becomes an interface between the smartcard 202 and the interface chip 210. In existing smartcard readers, this interface is normally exposed and susceptible to probing by criminals. In various embodiments of the invention, direct contact at this contact area 310, coupled with the closed secure cavity 208, offers an enhanced security level at a smartcard reader interface. Only processed or encrypted data could be exposed at the data line 214.

Figure 4:
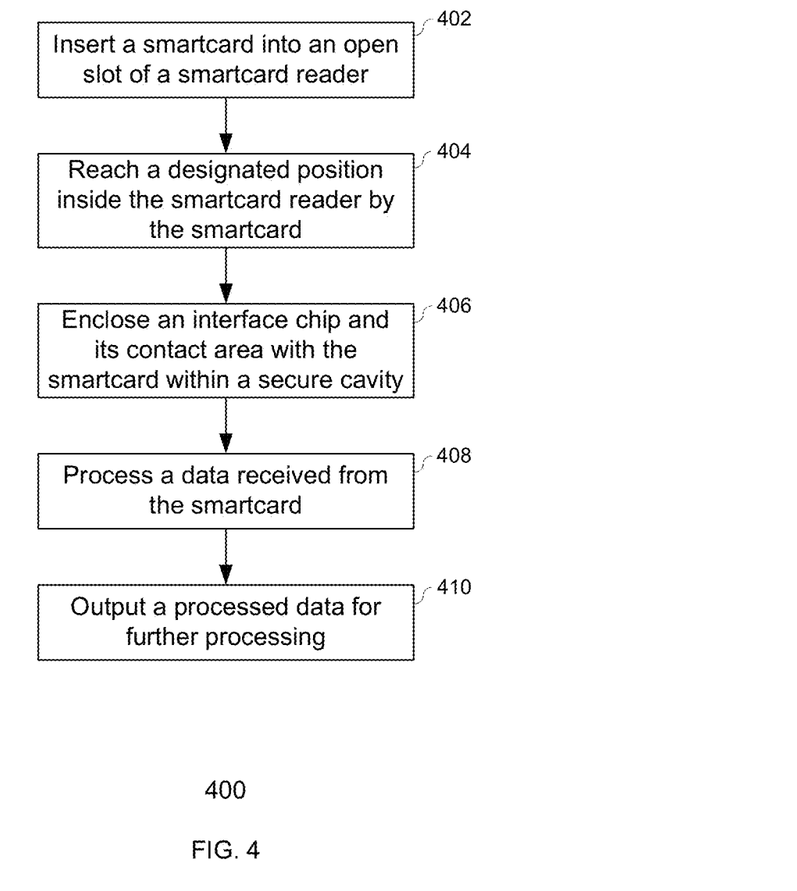
FIG. 4 illustrates an exemplary flow chart of a method for processing a smartcard according to various embodiments of the invention.

FIG. 4 illustrates an exemplary flow chart 400 of a method for processing a smartcard according to various embodiments of the invention. At step 402, a smartcard is inserted into an open slot of a smartcard reader. The smartcard comprises a smartcard IC that is coupled to electrical connectors for data input and output. As the smartcard reaches its designated position or depth within the smartcard reader at step 404, the electrical connectors on the smartcard are aligned to and in direct contact with mechanical contacts on an interface chip within the smartcard reader. The interface chip is situated within a secure cavity included in the smartcard reader, and flip-chip coupled to the smartcard via the direct contact between the mechanical contacts on the interface chip and the electrical connects on the smartcard. At step 406, the secure cavity fully encloses the interface and its contact area with the smartcard, and the interface chip is directly situated on top of the smartcard, covering their contact area. At step 408, the interface chip processes data received from the smartcard. At step 410, the smartcard reader outputs a processed data to a processor 302 for further processing. In one embodiment, data extracted from the smartcard is encrypted according to an encryption algorithm in the interface chip.

Figure 5:
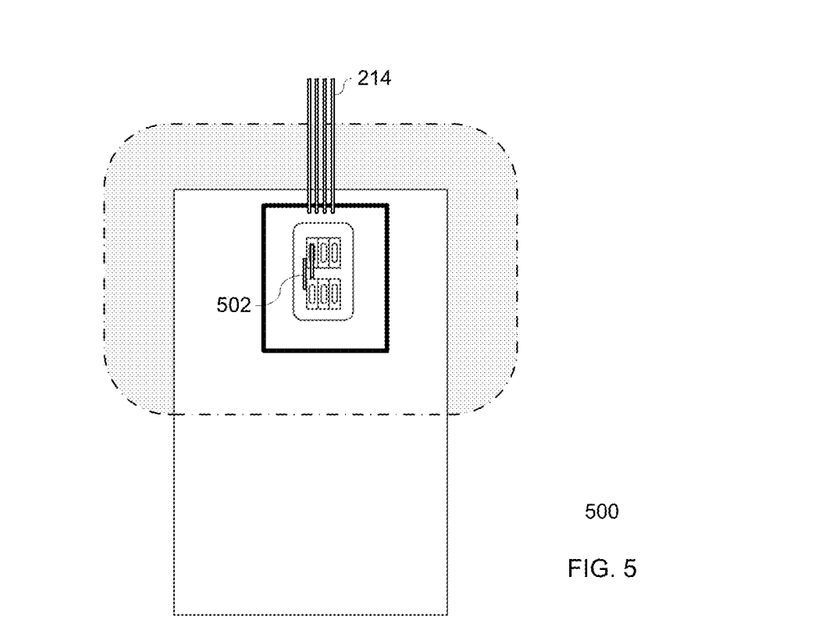
FIG. 5 illustrates an exemplary diagram of a smartcard reader based on a tamper detection loop according to various embodiments of the invention.

FIG. 5 illustrates an exemplary diagram 500 of a smartcard reader based on a tamper detection loop according to various embodiments of the invention. In addition to some power lines and the data lines 214, the smartcard reader comprises tamper detection leads 502. These tamper detection leads 502 are used to create one or more tamper detection loops that bind the interface chip 210 and the system housing 204. In some embodiments, the system housing 204 includes a security mesh, and the security mesh may be coupled by the tamper detection leads 402 with the interface chip 210 to form the tamper detection loop. In some embodiments, the system housing 204 merely includes tamper detection lines that are coupled by the leads 502 to the interface chip 210.

The interface chip 210 uses established tamper detection circuit to monitor the tamper detection loop. Once the interface chip 210 is removed or the system housing 204 is probed, the interface chip 210 initializes a tamper response protocol and outputs a warning signal. The processor 302 may rely on such a warning signal to enable a series of operations in order to deter the tamper attempt.

In some embodiments, the smartcard socket or the system housing 204 is short, such that a smartcard 202 is only partially inserted and half of the smartcard 202 remains out of the smartcard reader 200. Such a short housing 204 brings the secure cavity 208 closer to the open slot 206 at the smartcard reader 200 and potentially invites tamper attempts via this open slot 206. Moreover, since a magnetic stripe requires full insertion, a magnetic card reader may never be integrated into the smartcard reader 202 that has a short housing 204. When both magnetic stripe and integrated circuits chips are used, a short housing 204 could fundamentally limit application of this smartcard reader 200. Therefore, in view of data security and technology compatibility, a long system housing, i.e., a longer smartcard socket, is a desirable feature that needs to be incorporated in some smartcard readers 200.

Figure 6:
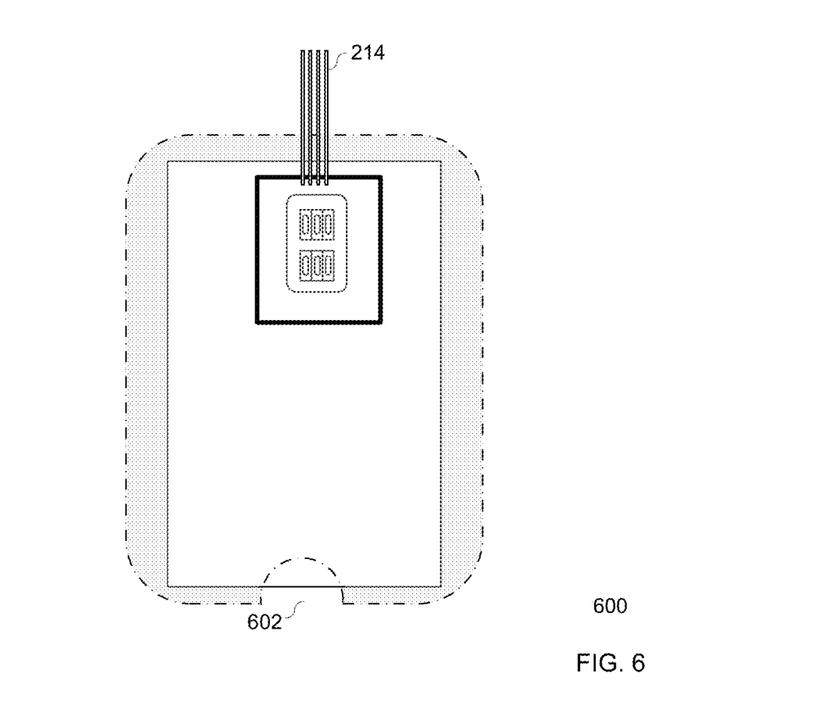
FIG. 6 illustrates an exemplary diagram of a smartcard reader that has a deep socket according to various embodiments in the invention.

FIG. 6 illustrates an exemplary diagram 600 of a smartcard reader that has a deep socket according to various embodiments in the invention. The smartcard 202 is fully inserted into the system housing 204. The contact area between the interface chip 210 and the smartcard 202 is thus recessed away from the front of the housing 204, further improving the security level. In certain embodiments, a cutout 602 is incorporated for manual card removal, sparing a need for using electrical motor to draw the smartcard 202 from such a deep housing 204.

Figure 7:
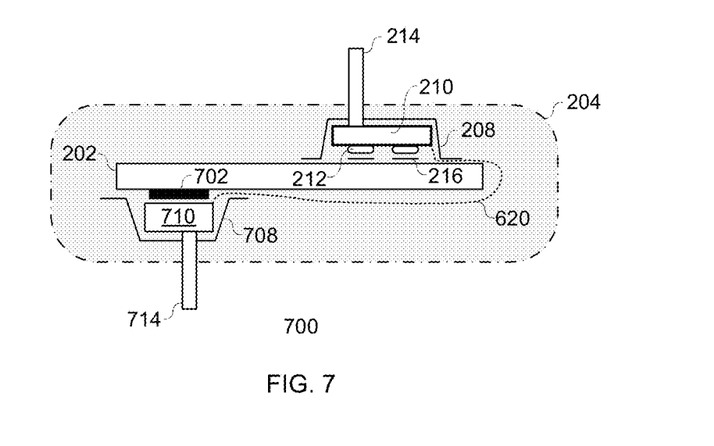
FIG. 7 illustrates an exemplary block diagram of an integrated card reader that processes both a magnetic stripe and smartcard integrated circuit (IC) according to various embodiments in the invention.

FIG. 7 illustrates an exemplary block diagram 700 of an integrated card reader that processes a magnetic stripe and a smartcard integrated circuit (IC) according to various embodiments in the invention. This integrated card reader has to adopt a deep system housing to accommodate reading of the magnetic stripe. In addition to a first secure cavity 208 and the interface chip 210 with its mechanical contacts 212, the integrated card reader comprises a second secure cavity 708 that incorporates a magnetic stripe reader 710. The electrical contacts 216 to the smartcard IC and the magnetic stripe 702 are normally located on distinct sides of a credit or debit card, and therefore, the first and second secure cavity 208 and 708 are located on two respective internal sides within the card reader 700. In order to accommodate the magnetic stripe 702, the system housing 704 has to extend substantially beyond the full length of the credit or debit card.

The magnetic stripe reader 710 further comprises a magnetic stripe head and a magnetic stripe reader IC. The magnetic stripe head is coupled to extract confidential data from the electromagnetic field of the magnetic stripe 702. The magnetic stripe reader IC further processes the confidential data from the magnetic stripe 702, and particularly, encrypts the confidential data prior to transferring the data out to the processor 302 for further processing. In one embodiment, the processed or encrypted data from the magnetic stripe reader 710 is coupled to the processor 302 directly via a separate data line 714.

In another embodiment, the processed data from the magnetic stripe reader and the interface chip share the data line 214. The processed or encrypted data extracted from the magnetic stripe is communicated via an encrypted link 720 to the interface chip 210 that is originally used to process and encrypt the confidential data from the smartcard IC. The interface chip 210 selects either data from the magnetic stripe or the smartcard IC, or time-multiplexes both data for outputting via the data line 214.

Figure 8A:
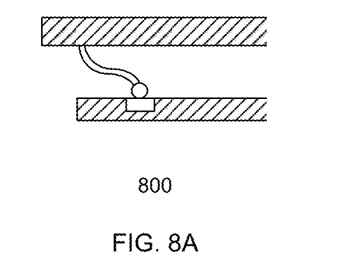
FIG. 8A illustrates an exemplary diagram of non-tampered contact between a mechanical contact at the interface chip and an electrical connector at a smartcard according to various embodiments in the invention.
Figure 8B:
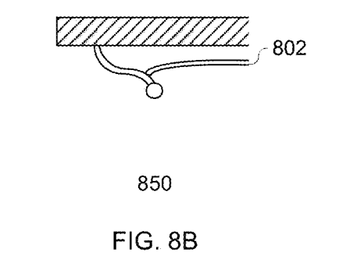
FIG. 8B illustrates an exemplary diagram of a tamper event when a listening device is coupled to mechanical contact of an interface chip according to various embodiments in the invention.

FIG. 8A illustrates an exemplary diagram of normal non-tampered contact between a mechanical contact 212 at the interface chip 210 and an electrical connector 216 at the smartcard 202 according to various embodiments of the invention. FIG. 8B illustrates an exemplary diagram of a tamper event when a listening device is coupled to the mechanical contact 212 according to various embodiments in the invention. In a tamper attempt, a tiny probing wire 802 is placed underneath the interface chip 210 to couple the signal out to a listening device. This wire is normally placed when the smartcard 202 is not inserted yet. Since in many systems the data at this contact is still in plaintext, such a tamper event may lead to disastrous leakage of confidential data including account numbers or identification numbers.

In some embodiments of the invention, the interface chip 210 is configured to track characteristics of its interface pins or mechanical contacts 212. Examples of the characteristics include, but are not limited to, resistance and capacitance at each contact. Prior to insertion of the smartcard 202, the interface chip 210 continuously monitors the characteristics of the mechanical contacts 212, and adjusts to gradual changes in the monitored characteristics due to different factors, such as temperature drift, moisture level variation or contact aging. In accordance, tampering thresholds may be configured to avoid false detection. When a listening device is inserted, the interface chip 210 will detect the sudden change in the characteristics of the mechanical contacts, and thus, issue a warning signal. Upon receiving the warning signal, the processor 302 invokes a series of anti-tampering procedures.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A smartcard reader, comprising:
   a system housing that comprises an open slot at one side for receiving a smartcard;
   a secure cavity, mounted on one internal side of the system housing, the secure cavity enclosing an interface chip and its contact area with the smartcard when the smartcard is inserted to a designated position within the system housing;
   the interface chip, attached inside the secure cavity, the interface chip facing towards the smartcard, processing a data extracted from the smartcard and generating a processed data;
   a plurality of mechanical contacts, formed on a top side of the interface chip, the plurality of mechanical contacts being aligned to and physically contacting a plurality of electrical connectors on the inserted smartcard such that the interface chip is electrically coupled to the smartcard;
   a data line, coupled to the interface chip, the data line coupling the processed data out of the system housing for further processing, and
   a plurality of tamper detection leads, the plurality of tamper detection leads electrically connecting the interface chip to the system housing to create at least one tamper detection loop.

2. The smartcard reader according to claim 1, wherein the interface chip encrypts the data extracted from the smartcard according to an encryption algorithm.

3. The smartcard reader according to claim 1, wherein the system housing comprises a security mesh that is coupled by the plurality of tamper detection leads to the interface chip to form the at least one tamper detection loop.

4. The smartcard reader according to claim 1, wherein the system housing is extended to cover the entire length of the smartcard but leaves a cutout at its open slot for removing the smartcard.

5. The smartcard reader according to claim 1, further comprising:
   a magnetic stripe cavity, mounted on an opposite side to the internal side where the first secure cavity is mounted, the magnetic stripe cavity enclosing a magnetic stripe reader and its contact area with a magnetic stripe on the card when the card is swiped.

6. The smartcard reader according to claim 5, wherein the magnetic stripe reader further comprises a magnetic stripe head and a magnetic stripe reader IC, the magnetic stripe head being coupled to extract confidential data from the electromagnetic field of the magnetic stripe, the magnetic stripe reader IC further processing the confidential data prior to transferring a processed data out for further processing.

7. The smartcard reader according to claim 5, further comprising an encrypted link that transfers a processed data from the magnetic stripe reader to the interface chip, such that the processed data is outputted at the data line.

8. The smartcard reader according to claim 1, wherein the interface chip tracks characteristics of the mechanical pins, and issues a warning signal upon detecting a sudden change of the characteristics.

9. A method of processing a smartcard, comprising the steps of:
   inserting the smartcard into an open slot of a system housing included in a smartcard reader, the smartcard reaching a designated position inside the system housing;
   enclosing an interface chip and its contact area with the smartcard within a secure cavity, wherein the interface chip is attached inside the secure cavity that is further mounted on an internal side of the system housing, and wherein a plurality of mechanical contacts on the interface chip are aligned to and physically contact a plurality of electrical connectors on the inserted smartcard such that the interface chip is electrically coupled to the smartcard;
   processing a data extracted from the smartcard; and
   outputting a processed data out of the smartcard reader for further processing,
   wherein the smartcard reader comprises a plurality of tamper detection leads, the plurality of tamper detection leads electrically connecting the interface chip to the system housing to create at least one tamper detection loop.

10. The method according to claim 9, wherein the interface chip encrypts the data extracted from the smartcard according to an encryption algorithm.

11. The method according to claim 10, wherein the system housing comprises a security mesh that is coupled by the plurality of tamper detection leads to the interface chip to form the at least one tamper detection loop.

12. The method according to claim 9, wherein the system housing is extended to cover the entire length of the smartcard but leaves a cutout at its open slot for removing the smartcard.

13. The method according to claim 9, wherein the system housing incorporates a magnetic stripe cavity that is mounted on an opposite side to the internal side where the first secure cavity is mounted, the magnetic stripe cavity enclosing a magnetic stripe reader and its contact area with a magnetic stripe embedded on the card when the card is swiped.

14. The method according to claim 9, wherein the interface chip tracks characteristics of the mechanical pins, and issues a warning signal upon detecting a sudden change of the characteristics.

15. A card reader, comprising:
   a system housing that comprises an open slot at one side for receiving a card, wherein the card comprises both a smartcard integrated circuit (IC) and a magnetic stripe;
   a first secure cavity, mounted on an internal side of the system housing, the first secure cavity enclosing an interface chip and its contact area with the card when the card is inserted to a designated position within the system housing;

a second secure cavity, mounted on an opposite side to the internal side where the first secure cavity is mounted, the second secure cavity enclosing a magnetic stripe reader and its contact area with a magnetic stripe on the card when the card is swiped;

the interface chip, attached inside the first secure cavity, the interface chip facing towards the card, processing a data extracted from the smartcard IC and generating a processed data;

a plurality of mechanical contacts, formed on a top side of the interface chip, the plurality of mechanical contacts being aligned to and physically contacting a plurality of electrical connectors on the inserted card such that the interface chip is electrically coupled to the smartcard IC;

a data line, coupled to the interface chip, the data line coupling the processed data out of the system housing for further processing, and a plurality of tamper detection leads, the plurality of tamper detection leads electrically connecting the interface chip to the system housing to create at least one tamper detection loop.

16. The card reader according to claim 15, wherein the magnetic stripe reader further comprises a magnetic stripe head and a magnetic stripe reader IC, the magnetic stripe head being coupled to extract confidential data from the electromagnetic field of the magnetic stripe, the magnetic stripe reader IC further processing the confidential data prior to transferring the processed data out for further processing.

17. The card reader according to claim 15, further comprising an encrypted link that transfers a processed data from the magnetic stripe reader to the interface chip, such that the processed data is outputted at the data line.

18. The card reader according to claim 15, further comprising a secondary data line, coupled to the magnetic stripe reader, the secondary data line coupling a processed data from the magnetic stripe reader out of the system housing for further processing.

\* \* \* \* \*